(12) United States Patent
Zosel et al.

(10) Patent No.: US 12,437,169 B1
(45) Date of Patent: Oct. 7, 2025

(54) INDICIA READER AND INDICIA READER SYSTEM

(71) Applicant: ZEBRA TECHNOLOGIES CORPORATION, Lincolnshire, IL (US)

(72) Inventors: Andrew Joseph Zosel, Blaine, WA (US); Darran Michael Handshaw, Sound Beach, NY (US); Edward Barkan, Miller Place, NY (US); Mark Drzymala, Saint James, NY (US); John Britts, Port Jefferson Station, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/821,011

(22) Filed: Aug. 30, 2024

(51) Int. Cl.
*G06K 7/10* (2006.01)
*G06K 7/14* (2006.01)

(52) U.S. Cl.
CPC ......... *G06K 7/1096* (2013.01); *G06K 7/1413* (2013.01)

(58) Field of Classification Search
CPC .................................................... G06K 7/1096
USPC .......................................................... 235/383
See application file for complete search history.

(56) References Cited

U.S. PATENT DOCUMENTS

2021/0375104 A1* 12/2021 Handshaw ........... G06Q 20/204

* cited by examiner

*Primary Examiner* — Suezu Ellis
(74) *Attorney, Agent, or Firm* — Yuri Astvatsaturov

(57) ABSTRACT

An example indicia reader includes a housing configured to be positioned above a product scanning area. The housing has a width, a height, and a width to height ratio equal to or greater than 2:1. A barcode camera is positioned at least partially within the housing and has a first field-of-view (FOV) configured to be directed towards the product scanning area. A vision camera is positioned at least partially within the housing and has a second FOV configured to at least partially overlap the first FOV. A controller is positioned within the housing and is communicatively coupled to the barcode camera and the vision camera. A decoder module is positioned within the housing and is communicatively coupled to the barcode camera and the controller. A video processing module is positioned within the housing and is communicatively coupled to the vision camera.

22 Claims, 7 Drawing Sheets

INDICIA READER AND INDICIA READER SYSTEM

BACKGROUND

Indicia reader assemblies, such as those used in retail applications, can include vision systems that include overhead cameras to provide expanded vision capabilities. However, current overhead camera designs incorporate large arms to support the camera modules, which can affect the approachability and aesthetics of the indicia reader and can make it more difficult to use in existing retail space furniture. It would be beneficial to provide an indicia reader with overhead cameras that could be used on its own, that could be added to an existing indicia reader without additional supports, that could be seamlessly integrated into a display, or that can be used as part of an indicia reader system with a display to minimize the impact on aesthetics avoid issues with installation in existing retail space furniture.

SUMMARY

In an embodiment, the present invention is an indicia reader including a housing configured to be positioned above a product scanning area. The housing includes a width, a height, and a width to height ratio equal to or greater than 2:1. A barcode camera is positioned at least partially within the housing and has a first field-of-view (FOV) configured to be directed towards the product scanning area. A vision camera is positioned at least partially within the housing and has a second FOV configured to at least partially overlap the first FOV. A controller is positioned within the housing and is communicatively coupled to the barcode camera and the vision camera. A decoder module is positioned within the housing and is communicatively coupled to the barcode camera and the controller. A video processing module is positioned within the housing and is communicatively coupled to the vision camera.

In a variation of this embodiment, the width of the housing is greater than 11.5 inches.

In another variation of this embodiment, the housing is configured to be attached to and mounted above a monitor.

In another variation of this embodiment, the indicia reader includes a second vision camera positioned at least partially within the housing and communicatively coupled to the controller and the video processing module. The second vision camera has a third FOV configured to at least partially overlap the first FOV.

In another variation of this embodiment, the second FOV at least partially overlaps the third FOV.

In another variation of this embodiment, the vision camera is located proximate a first end of the housing and the second vision camera is located proximate a second end of the housing, opposite the first end.

In another variation of this embodiment, the indicia reader includes a visual user interface communicatively coupled to the controller.

In another variation of this embodiment, the indicia reader includes a first aimer positioned at least partially within the housing and configured to produce a first light beam and a second aimer positioned at least partially within the housing and configured to produce a second light beam. The first aimer and the second aimer are positioned such that the first light beam and the second light beam intersect at a predetermined distance below the indicia reader.

In another variation of this embodiment, the indicia reader includes an illumination source positioned at least partially within the housing and communicatively coupled to the controller and configured to provide an illumination over the product scanning area.

In another variation of this embodiment, the indicia reader includes at least one of a three-dimensional (3D) sensor, an infra-red (IR) wakeup system, a radio-frequency identification (RFID) antenna, a radar, a radio frequency (RF) detector, and/or an electronic article surveillance (EAS) system positioned at least partially within the housing and communicatively coupled to the controller.

In another variation of this embodiment, there are no internal mirrors within the housing.

In another embodiment, the present invention is an indicia reader including a housing configured to be attached to and mounted above a monitor and above a product scanning area. A barcode camera is positioned at least partially within the housing and has a first field-of-view (FOV) configured to be directed towards the product scanning area. A vision camera is positioned at least partially within the housing and has a second FOV configured to at least partially overlap the first FOV. A controller is positioned within the housing and is communicatively coupled to the barcode camera and the vision camera. A decoder module is positioned within the housing and is communicatively coupled to the barcode camera and the controller. A video processing module is positioned within the housing and is communicatively coupled to the vision camera.

In a variation of this embodiment, a first distance between a front surface of the housing and a front surface of the monitor is less than or equal to 3 inches.

In another variation of this embodiment, a second distance between a left side surface of the housing and a left edge of the monitor is less than or equal to 1 inch and a third distance between a right side surface of the housing and right edge of the monitor is less than or equal to 1 inch.

In another variation of this embodiment, a width of the housing is adjustable.

In another variation of this embodiment, the first FOV is directed in front of a front surface of the monitor.

In another variation of this embodiment, the indicia reader includes a second vision camera positioned at least partially within the housing and communicatively coupled to the controller and the video processing module. The second vision camera has a third FOV configured to at least partially overlap the first FOV.

In another variation of this embodiment, the second FOV at least partially overlaps the third FOV.

In another variation of this embodiment, the vision camera is located proximate a first end of the housing and the second vision camera is located proximate a second end of the housing, opposite the first end.

In another variation of this embodiment, the indicia reader includes a visual user interface communicatively coupled to the controller.

In another variation of this embodiment, the indicia reader includes a first aimer positioned at least partially within the housing and configured to produce a first light beam and a second aimer positioned at least partially within the housing and configured to produce a second light beam. The first aimer and the second aimer are positioned such that the first light beam and the second light beam intersect at a predetermined distance below the indicia reader.

In another variation of this embodiment, the indicia reader includes an illumination source positioned at least partially within the housing and communicatively coupled to the controller and configured to provide an illumination over the product scanning area.

In another embodiment, the present invention is an indicia reader system including a monitor and an indicia reader removably attached to and positioned above the monitor. The indicia reader includes a housing configured to be removably attached to and mounted above the monitor and above a product scanning area. A barcode camera is positioned at least partially within the housing and has a first field-of-view (FOV) configured to be directed towards the product scanning area. A vision camera is positioned at least partially within the housing and has a second FOV configured to at least partially overlap the first FOV. A controller is positioned within the housing and is communicatively coupled to the barcode camera and the vision camera. A decoder module is positioned within the housing and is communicatively coupled to the barcode camera and the controller. A video processing module is positioned within the housing and is communicatively coupled to the vision camera.

In a variation of this embodiment, the housing includes a width, a height, and a width to height ratio equal to or greater than 2:1.

In another variation of this embodiment, the width of the housing is greater than 11.5 inches.

In another variation of this embodiment, a first distance between a front surface of the housing and a front surface of the monitor is less than or equal to 3 inches.

In another variation of this embodiment, a second distance between a left side surface of the housing and a left edge of the monitor is less than or equal to 1 inch and a third distance between a right side surface of the housing and right edge of the monitor is less than or equal to 1 inch.

In another variation of this embodiment, the indicia reader includes a second vision camera positioned at least partially within the housing and communicatively coupled to the controller and the video processing module. The second vision camera has a third FOV configured to at least partially overlap the first FOV.

In another variation of this embodiment, the second FOV at least partially overlaps the third FOV.

In another variation of this embodiment, the vision camera is located proximate a first end of the housing and the second vision camera is located proximate a second end of the housing, opposite the first end.

In another variation of this embodiment, the indicia reader includes a visual user interface communicatively coupled to the controller.

In another variation of this embodiment, the indicia reader includes a first aimer positioned at least partially within the housing and configured to produce a first light beam and a second aimer positioned at least partially within the housing and configured to produce a second light beam. The first aimer and the second aimer are positioned such that the first light beam and the second light beam intersect at a predetermined distance below the indicia reader.

In another variation of this embodiment, the indicia reader includes an illumination source positioned at least partially within the housing and communicatively coupled to the controller, the illumination source configured to provide an illumination over the product scanning area.

In another embodiment, the present invention is an indicia reader including a housing configured to be positioned above a product scanning area. The housing includes a width, a height, and a width to height ratio equal to or greater than 2:1. A vision camera is positioned at least partially within the housing and has a second field-of-view (FOV) having a first inner lateral boundary that forms a first angle with a bottom surface of the housing that is greater than or equal to 25 degrees and less than or equal to 55 degrees. A second vision camera is positioned at least partially within the housing and has a third FOV having a second inner lateral boundary that forms a second angle with the bottom surface of the housing that is greater than or equal to 25 degrees and less than or equal to 55 degrees. A controller is positioned within the housing and is communicatively coupled to the vision camera and the second vision camera. A video processing module is positioned within the housing and is communicatively coupled to the vision camera and the second vision camera.

In a variation of this embodiment, the second FOV has a first outer lateral boundary that forms a third angle with the bottom surface of the housing that is greater than or equal to 10 degrees and less than or equal to 50 degrees and the third FOV has a second outer lateral boundary that forms a fourth angle with the bottom surface of the housing that is greater than or equal to 10 degrees and less than or equal to 50 degrees.

In another variation of this embodiment, the second FOV at least partially overlaps the third FOV.

In another variation of this embodiment, the indicia reader includes a barcode camera and a decoder module positioned at least partially within the housing. The barcode camera has a first FOV configured to be directed towards the product scanning area and the decoder module is communicatively coupled to the barcode camera and the controller.

In another variation of this embodiment, the second FOV at least partially overlaps the first FOV and the third FOV at least partially overlaps the first FOV.

In another variation of this embodiment, the width of the housing is greater than 11.5 inches.

In another variation of this embodiment, the housing is configured to be attached to and mounted above a monitor.

In another variation of this embodiment, the vision camera is located proximate a first end of the housing and the second vision camera is located proximate a second end of the housing, opposite the first end.

In another variation of this embodiment, the indicia reader includes a visual user interface communicatively coupled to the controller.

In another variation of this embodiment, the indicia reader includes an illumination source positioned at least partially within the housing and communicatively coupled to the controller. The illumination source is configured to provide an illumination over the product scanning area.

In another variation of this embodiment, the indicia reader includes a first aimer positioned at least partially within the housing and configured to produce a first light beam and a second aimer positioned at least partially within the housing and configured to produce a second light beam. The first aimer and the second aimer are positioned such that the first light beam and the second light beam intersect at a predetermined distance below the indicia reader.

In another variation of this embodiment, the indicia reader includes at least one of a three-dimensional (3D) sensor, an infra-red (IR) wakeup system, a radio-frequency identification (RFID) antenna, a radar, a radio frequency (RF) detector, and/or an electronic article surveillance (EAS) system positioned at least partially within the housing and communicatively coupled to the controller.

In another variation of this embodiment, there are no internal mirrors within the housing.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
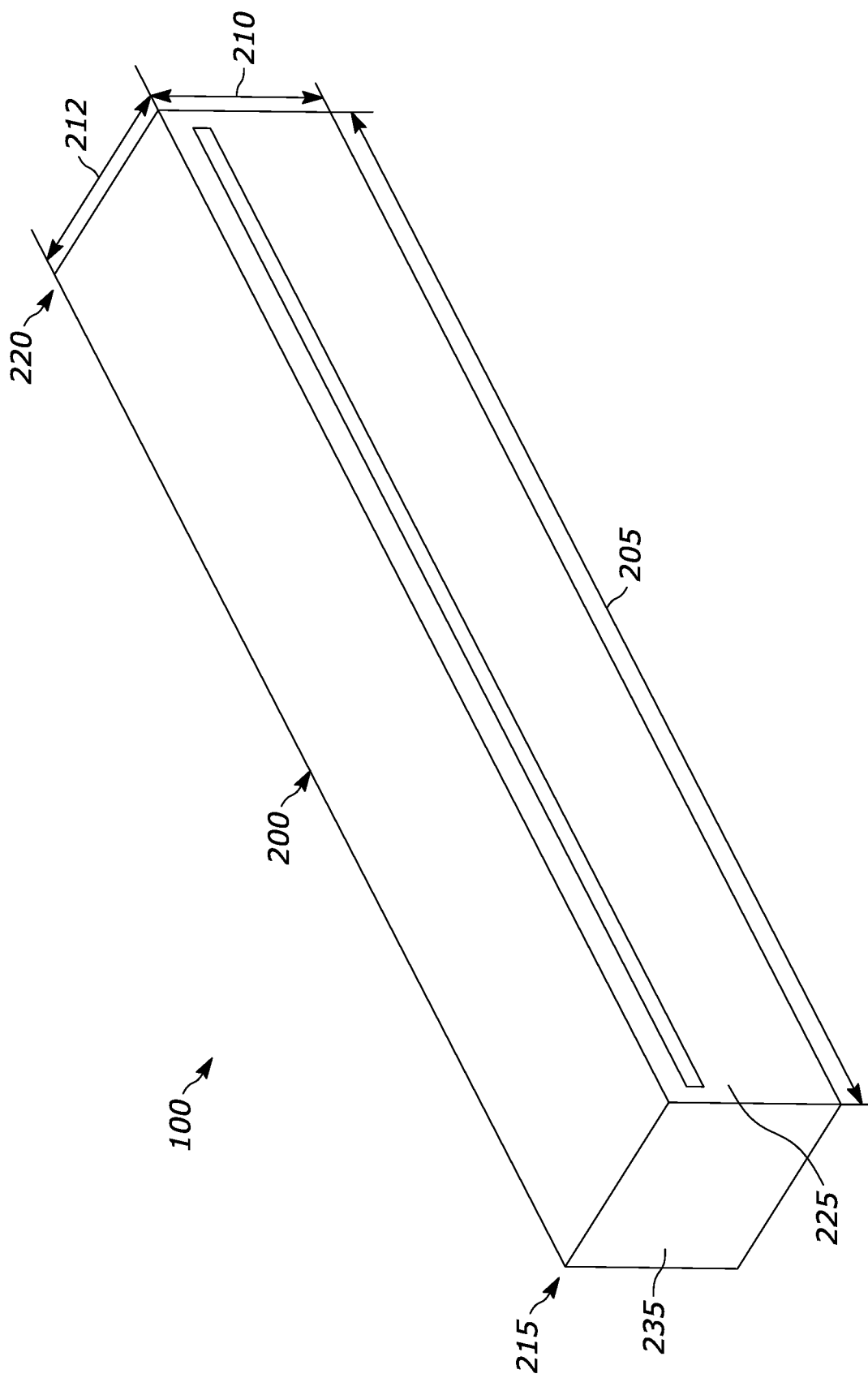
FIG. 1 illustrates a perspective view of an example indicia reader.

Skilled artisans will appreciate that elements in the figures are illustrated for simplicity and clarity, have not necessarily been drawn to scale, and that details that are not necessary for an understanding of the invention or that render other details difficult to perceive may be omitted. For example, the dimensions of some of the elements in the figures may be exaggerated relative to other elements to help to improve understanding of embodiments of the present invention.

The apparatus components have been represented where appropriate by conventional symbols in the drawings, showing only those components and specific details that are pertinent to understanding the examples of the present invention so as not to obscure the disclosure with details that will be readily apparent to those of ordinary skill in the art having the benefit of the description herein.

DETAILED DESCRIPTION

The example indicia readers and indicia reader assemblies disclosed herein provide vision systems with overhead cameras and can be used as stand-alone indicia readers, can be used with existing indicia readers (with or without additional supports), can be used with or integrated into monitors with or without an existing indicia reader, etc. This can provide a vision system at a retail checkout location with minimal impact on the aesthetics of the checkout location and without encountering issues with installation in existing retail space furniture.

For example, the example indicia readers can have a housing that is configured to be mounted to a surface (e.g., a wall, ceiling, etc.), to an existing indicia reader, to a monitor, etc. The housing can include one or more barcode cameras and/or one or more vision cameras, depending on the particular implementation, and can be used as a stand-alone indicia reader, can be used as part of an indicia reader system with a monitor, can be used with an existing indicia reader, etc., while provide a high-end vision system at the retail checkout location.

Figure 2:
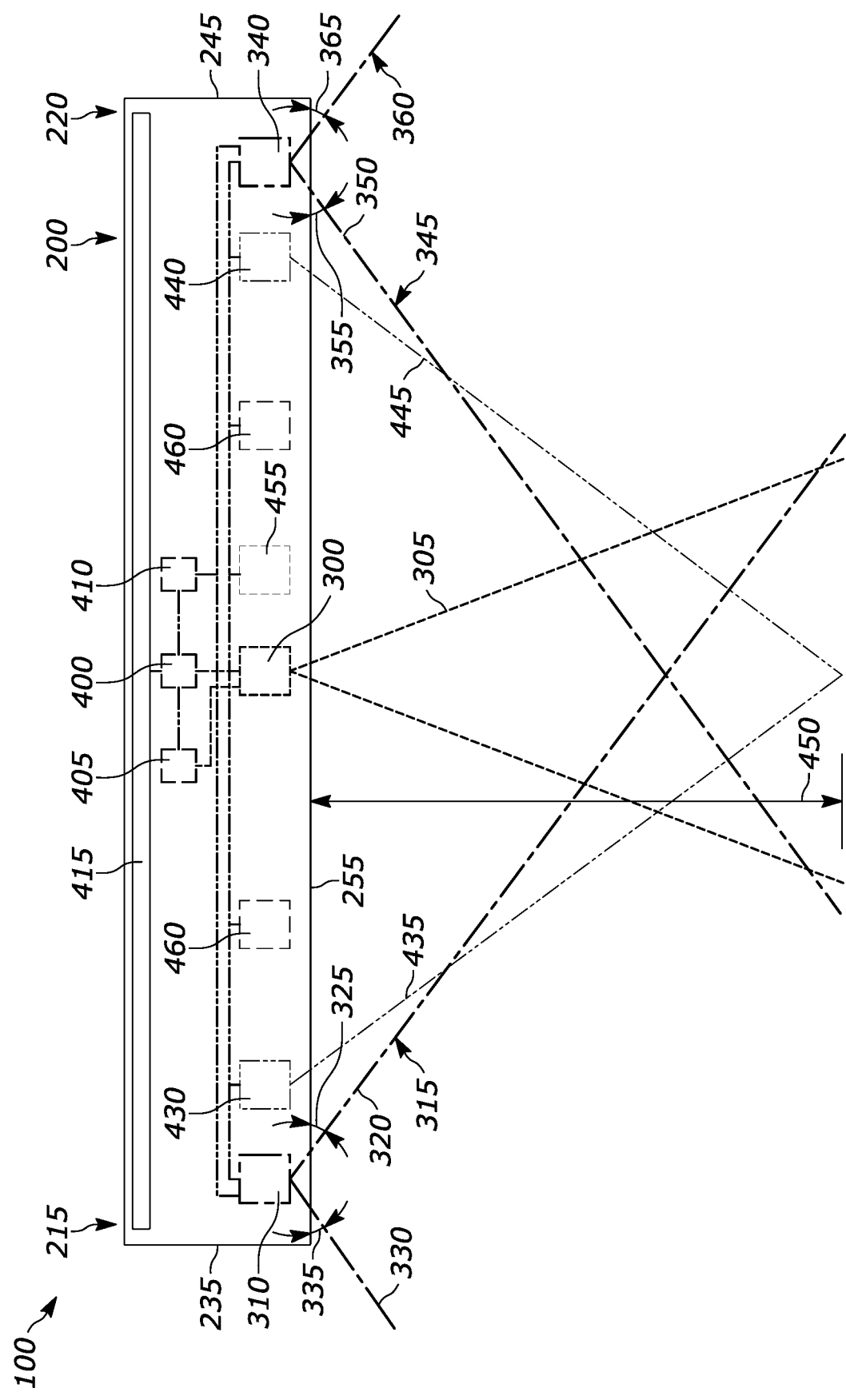
FIG. 2 illustrates a front view of the indicia reader of FIG. 1.
Figure 5:
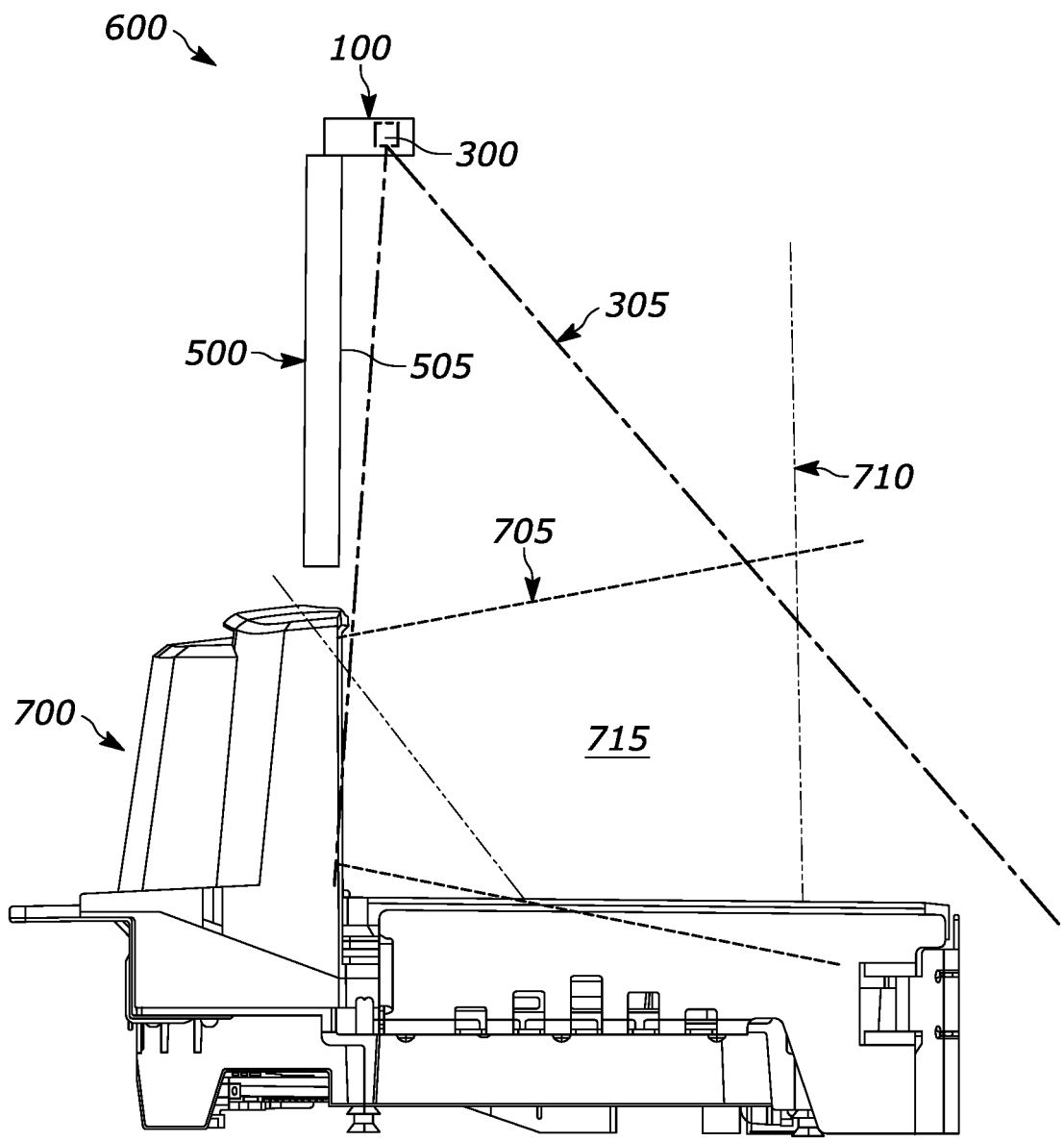
FIG. 5 illustrates a side view of the indicia reader system of FIG. 3 with a bioptic indicia reader.

Referring to FIGS. 1-2, an example indicia reader 100 is illustrated that includes a housing 200 that is configured to be positioned above a product scanning area 715. As used herein, product scanning area 715 is an area where an object having a barcode can be scanned for sale at a point of sale. For example, as shown in FIG. 5, if the point-of-sale includes a bioptic indicia reader 700, product scanning area 715 can be defined as the area where a first bioptic FOV 705 direct through a generally upright window in an upper housing portion of bioptic indicia reader 700 intersects a second bioptic FOV 710 direct through a generally horizontal window in a platter of bioptic indicia reader 700. Other product scanning areas are possible depending on the type of indicia reader used at a particular point-of-sale.

Housing 200 of indicia reader 100 has a width 205, a height 210, and a depth 212. As used herein, width 205 of housing 200 is measured in a generally horizontal direction generally in the direction that an object will be passed below housing 200 for scanning, height 210 of housing 200 is measured in a generally vertical direction perpendicular to width 205, and depth 212 of housing 200 is measured in a generally horizontal direction perpendicular to the direction of scanning, perpendicular to width 205, and perpendicular to height 210. Housing 200 has a width to height ratio that is equal to or greater than 2:1. In some implementations, the width to height ratio of housing 200 could be 5:1, 10:1, or larger. In the implementation show, the width to height ration of housing 200 is 20:1 and width 205 of housing 200 is greater than 11.5 inches.

Width 205 of housing 200 can also be adjustable, for example, by housing 200 having two telescoping body portions that can slide relative to each other to adjust width 205 as desired. Providing housing 200 with a width to height ratio that is equal to or greater than 2:1 can prevent indicia reader 100 from obscuring the line of sight between a customer and cashier in a traditional lane, can allow indicia reader 100 to take up minimal space in a kiosk footprint, and can provide indicia reader 100 with desired aesthetics. In addition, providing housing 200 with a width 205 greater than 11.5 inches can allow the FsOV of vision cameras in indicia reader 100 to extend over the sides of another indicia reader, which indicia reader 100 is positioned over, and can provide a disparity in angles between the vision cameras, such that they are able to see opposite ends of an object in a product scanning area. Housing 200 can be configured to attach to multiple support options, such as to stalks attached to an existing indicia reader, brackets that can hold indicia reader 100 above an indicia reader or a display, to adapters that can allow indicia reader 100 to attach to a standardized connector that is part of another device, such as a display, etc.

Figure 2A:
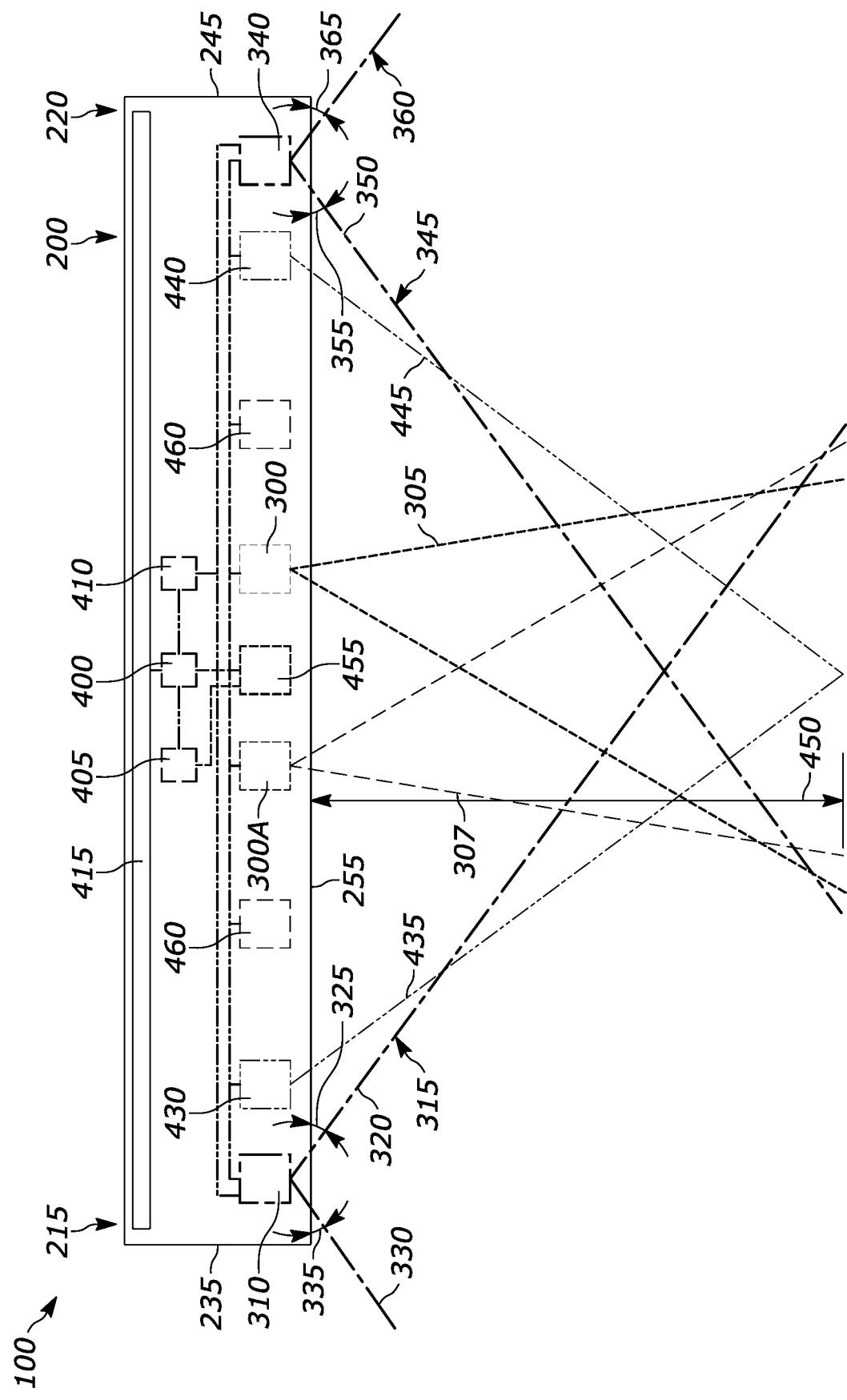
FIG. 2A illustrates a front view of the indicia reader of FIG. 2 with an additional barcode camera.
Figure 6:
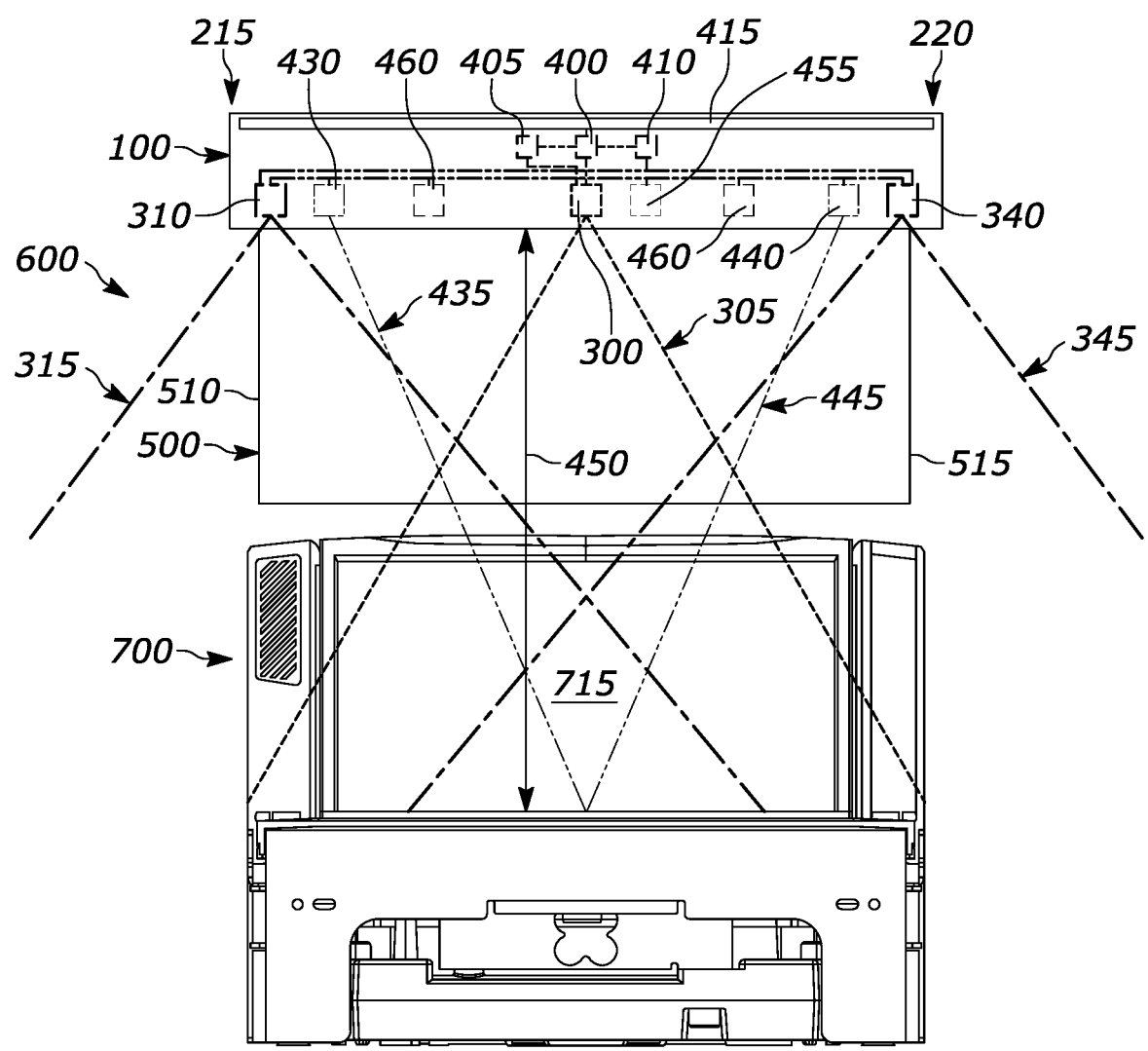
FIG. 6 illustrates a front view of the indicia reader system and bioptic indicia reader of FIG. 5.

In some implementations, indicia reader 100 can include a barcode camera 300, which can be positioned at least partially within housing 200. Barcode camera 300 can have a first FOV 305 that is configured to be directed towards product scanning area 715. First FOV 305 can substantially encompass product scanning area 715 and, in the implementation shown in FIGS. 5-6, first FOV 305 can cover 90% of a footprint of the platter of bioptic indicia reader 700, which ensures coverage of the platter and product scanning area 715 by first FOV 305. As used herein the footprint of the platter is the outer perimeter of the platter when looking straight down from above bioptic indicia reader 700. In the implementation shown in FIG. 2A, indicia reader 100 also includes a second barcode camera 300A, which can be positioned at least partially within housing 200 and can have a fourth FOV 307 that is configured to be directed towards product scanning area 715. In this implementation, barcode camera 300 and second barcode camera 300A are positioned on opposite sides of a centerline of housing 200 such that first FOV 305 and fourth FOV 307 are directed in opposite directions to allow barcode camera 300 and second barcode camera 300A to scan the left and right sides of an item in product scanning area 715.

Indicia reader 100 can also include a vision camera 310, which can be positioned at least partially within housing 200. Vision camera 310 can have a second FOV 315 that is configured to at least partially overlap first FOV 305 and that is configured to extend at least partially outside of product scanning area 715. For example, second FOV 315 can extend into an output area. As used herein, the output area is an area where a user can place/bag items already scanned, or where an output conveyor directs items away from product scanning area 715. In the implementation shown in FIGS. 5-6, second FOV 315 can cover 90% of the footprint of the platter of bioptic indicia reader 700, which ensures coverage of the platter and product scanning area 715 by second FOV 315 and the output area can be located on either side of bioptic indicia reader 700 and can have a depth that is approximately the same as the depth of the platter of bioptic indicia reader 700 and a length that extends approximately 2 feet from a side of the platter of bioptic indicia reader 700. Second FOV 315 can also see downward into products/bags in the output area and can be configured to cover an area in front of bioptic indicia reader 700 and in front of the output area. To provide the desired coverage of second FOV 315, second FOV 315 can have a first inner lateral boundary 320 that forms a first angle 325 with bottom surface 255 of housing 200 and a first outer lateral boundary 330 that forms a third angle 335 with bottom surface 255 of housing 200. First angle 325 can be greater than or equal to 25 degrees and less than or equal to 55 degrees and third angle 335 can be greater than or equal to 10 degrees and less than or equal to 50 degrees. Vision camera 310 can also be configured to identify a predetermined illumination, such as a light of a certain color, brightness, and/or duration, that indicates a good scan of a barcode on a product, which can be used to verify that all products passed through second FOV 315 have been properly scanned before they are placed in the output area.

Indicia reader 100 can also include a second vision camera 340, which can be positioned at least partially within housing 200. In the implementation shown, vision camera 310 is located proximate a first end 215 of housing 200 and second vision camera 340 is located proximate a second end 220 of housing 200, opposite first end 215. Second vision camera 340 can have a third FOV 345 that is configured to at least partially overlap first FOV 305 and that is configured to extend at least partially outside of product scanning area 715. For example, third FOV 345 can extend into an input area. As used herein, the input area is an area where a user can position a cart and/or place items to be scanned, or where an input conveyor directs items towards product scanning area 715. In the implementation shown in FIGS. 5-6, third FOV 345 can cover 90% of the footprint of the platter of bioptic indicia reader 700, which ensures coverage of the platter and product scanning area 715 by third FOV 345 and the input area can be located on either side of bioptic indicia reader 700, opposite the output area, and can have a depth that is approximately the same as the depth of the platter of bioptic indicia reader 700 and a length that extends approximately 2 feet from a side of the platter of bioptic indicia reader 700. Third FOV 345 can also see downward into a cart positioned in the input area or products placed in the input area 115 and can be configured to cover an area in front of bioptic indicia reader 700 and in front of the input area. To provide the desired coverage of third FOV 345, third FOV 345 can have a second inner lateral boundary 350 that forms a second angle 355 with bottom surface 255 of housing 200 and a second outer lateral boundary 360 that forms a fourth angle 365 with bottom surface 255 of housing 200. Second angle 355 can be greater than or equal to 25 degrees and less than or equal to 55 degrees and fourth angle 365 can be greater than or equal to 10 degrees and less than or equal to 50 degrees. In the implementation shown, third FOV 345 also overlaps second FOV 315. In the implementation shown, third FOV 345 and second FOV 315 overlap (i.e., first inner lateral boundary 320 of second FOV 315 and second inner lateral boundary 350 of third FOV 345 intersect) at a distance of 7 inches below a bottom surface 255 of housing 200. Second vision camera 340 can also be configured to identify a predetermined illumination, such as a light of a certain color, brightness, and/or duration, that indicates a good scan of a barcode on a product, which can be used to verify that all products passed through third FOV 345 have been properly scanned before they are placed in the output area.

Indicia reader 100 can include any combination of one or more barcode camera(s) 300 and/or one or more vision camera(s) 310. For example, in the implementations shown herein, indicia reader 100 has one barcode camera 300 and two vision cameras 310. In other implementations, indicia reader 100 can have one barcode camera 300 and one vision camera 310, can have two barcode cameras 300 and one vision camera 310, can have two barcode cameras 300 and two vision cameras 310, can have two vision camera 310 and no barcode cameras 300, etc. To keep indicia reader 100 as compact as possible, first FOV 305 of barcode camera 300, second FOV 315 of vision camera 310, and third FOV 345 of second vision camera 340 can extend directly out of housing 200 with no internal mirrors within housing 200 to redirect the FsOV.

Indicia reader 100 can also include various electronic components. For example, indicia reader 100 can include a controller 400 that is positioned within housing 200 and is communicatively coupled to barcode camera 300, vision camera 310, and second vision camera 340. Indicia reader 100 can also include a decoder module 405 that is positioned within housing 200 and is communicatively coupled to barcode camera 300 and controller 400. Decoder module 405 can also be communicatively coupled to vision camera if vision camera also used to read and decode barcodes and configured to receive data from barcode camera 300, and/or vision camera 310 if used to read barcodes, and to decode any barcodes received. Indicia reader 100 can also include a video processing module 410 that is positioned within housing 200 and is communicatively coupled to vision camera 310 and second vision camera 340.

In some implementations, indicia reader 100 can also include a visual user interface 415 that is communicatively coupled to controller 400. For example, visual user interface 415 can include one or more light emitting diodes (LEDs) and controller 400 can be configured to illuminate the LEDs in different colors, intensities, patterns, etc., to provide various indications to a user (e.g., green illumination when there is a good scan, red illumination when there is a bad or missed scan, yellow illumination or intermittent illumination when employee assistance needed, etc.).

In some implementations, indicia reader 100 can also include a first aimer 430 positioned at least partially within housing 200 and configured to produce a first light beam 435 and a second aimer 440 positioned at least partially within housing 200 and configured to produce a second light beam 445, which can be used during installation of indicia reader 100 to locate indicia reader 100 at a desired height above a surface, such as a platter of bioptic indicia reader 700. First aimer 430 and second aimer 440 can be positioned such that first light beam 435 and second light beam 445 intersect at a predetermined distance 450 below bottom surface 255 of housing 200 of indicia reader 100, which can be a desired distance above the surface. During installation, first light beam 435 and second light beam 445 will produce individual patterns on the surface below indicia reader 100. As indicia reader 100 is moved closer to predetermined distance 450, the patterns produced by first light beam 435 and second light beam 445 on the surface will move closer and the patterns will converge (i.e., first light beam 435 and second light beam 445 will intersect) when indicia reader 100 is at predetermined distance 450.

In some implementations, indicia reader 100 can also include an illumination source 455 that is positioned at least partially within housing 200 and is communicatively coupled to controller 400. Illumination source 455 can be configured to provide an illumination over product scanning area 715 and, in some implementations, can include multiple colors of illumination or multiple illumination arrays for use with the barcode camera(s) 300, 300A and/or vision camera(s) 310, 340.

In some implementations, indicia reader 100 can also include an accessory 460 that is positioned at least partially within housing 200 and is communicatively coupled to controller 400. Accessory 460 can be one or more of a three-dimensional (3D) sensor, an infra-red (IR) wakeup system, a radio-frequency identification (RFID) antenna, a radar, a radio frequency (RF) detector, and/or an electronic article surveillance (EAS) system, etc.

In some implementations, indicia reader 100 can also include a microphone (not shown), or other audio detector, that is positioned at least partially within housing 200 and that can be configured to identify a predetermined audio signal, such as a sound of a certain tone, loudness, and/or duration, that indicates a good scan of a barcode on a product, which can be used to verify that all products passed through second FOV 315 and/or third FOV 345 have been properly scanned before they are placed in the output area.

Figure 3:
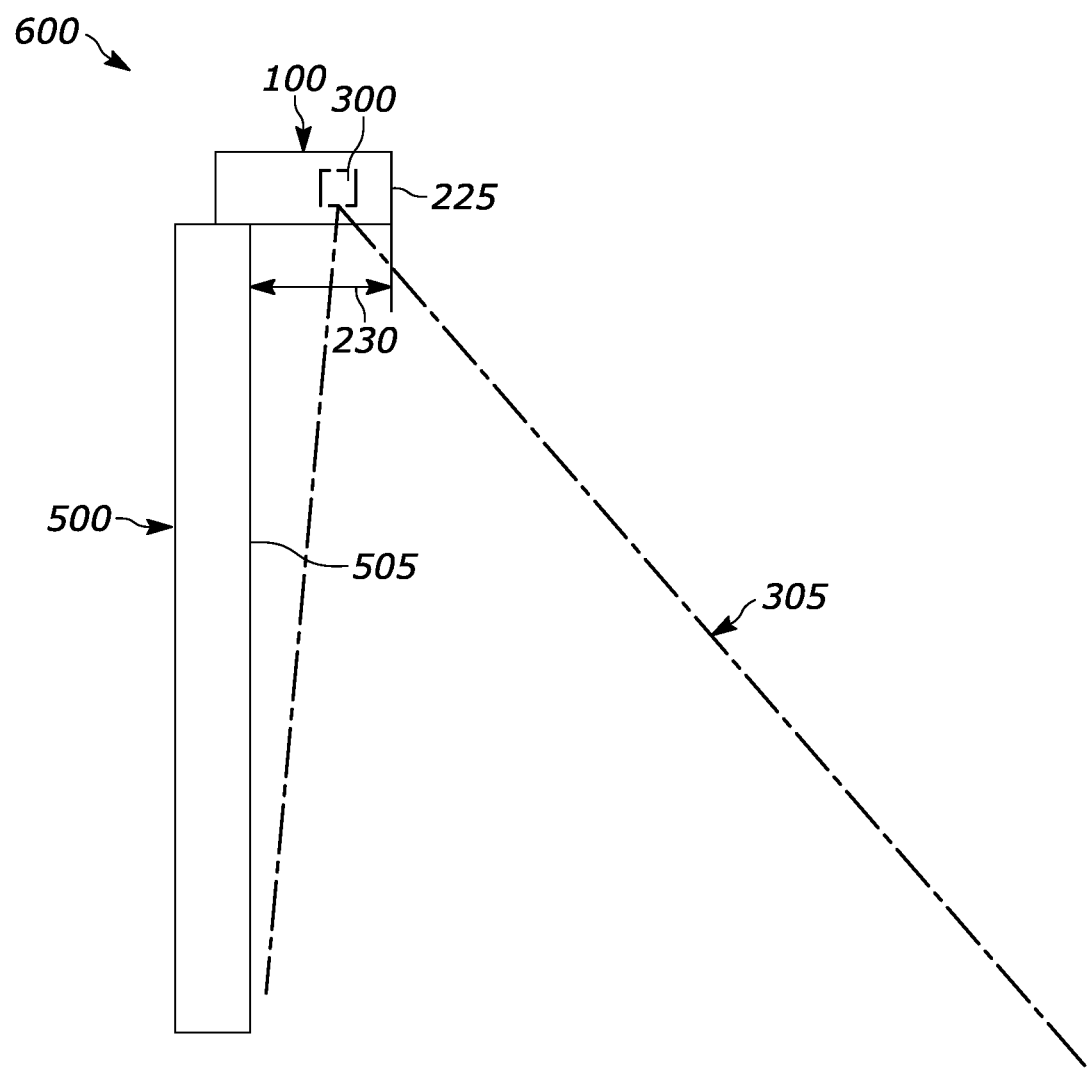
FIG. 3 illustrates a side view of an example indicia reader system with the indicia reader of FIG. 1 and a display.
Figure 4:
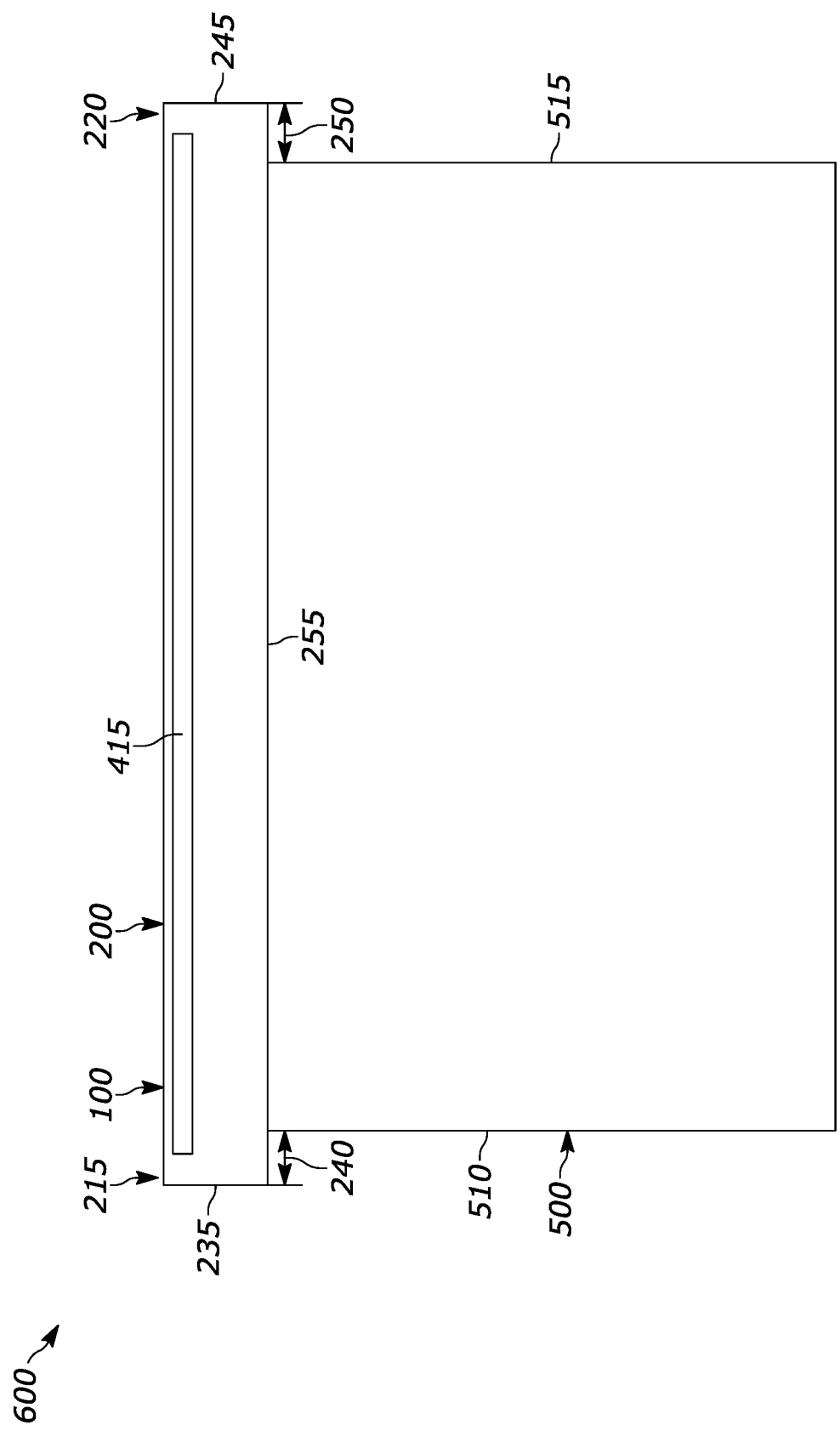
FIG. 4 illustrates a front view of the indicia reader system of FIG. 3.

Housing 200 of indicia reader 100 can also be configured to be removably attached to and mounted above a monitor. For example, FIGS. 3-4 illustrate an indicia reader system 600 that includes indicia reader 100 and a monitor 500, with indicia reader 100 removably attached to and positioned above monitor 500 such that first FOV 305 is directed in front of a front surface 505 of monitor 500. In some implementations, a first distance 230 between a front surface 225 of housing 200 and front surface 505 of monitor 500 can be less than or equal to 3 inches, which allows housing 200 to project forward to clear front surface 505 of monitor 500, while not projecting too far so housing 200 can look like a more seamless part of monitor 500. In the particular implementation shown, first distance 230 is 1 inch. In addition, a second distance 240 between a left side surface 235 (left side as shown in orientation in FIG. 4) of housing 200 and a left edge 510 of monitor 500 can be less than or equal to 1 inch and a third distance 250 between a right side surface 245 (right side as shown in orientation in FIG. 4) of housing 200 and a right edge 515 of monitor 500 can be less than or equal to 1 inch, which allows housing to project outward from left edge 510 and right edge 515 of monitor 500 to allow vision camera 310 and second vision camera 340 to see past the sides of bioptic indicia reader 700, while not projecting too far so housing 200 can look like a more seamless part of monitor 500. Monitor 500 can be configured to communicate with indicia reader 100 and can be configured to display an aim graphic or pattern, a FOV size indicator, dots, arrows, etc. to show a user where to place a barcode on an object in front of the display in order to best decode the barcode with indicia reader 100. Monitor 500 could also be configured to show a video feed from barcode camera 300, vision camera 310, and/or second vision camera 340 and to assist in guiding a user as to where to scan. Monitor 500 can also be configured to provide user feedback when an item is scanned incorrectly or to direct a user to rescan an item.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An indicia reader, comprising:
a housing configured to be positioned above a product scanning area, the housing comprising a width, a height, and a width to height ratio equal to or greater than 2:1;
a barcode camera positioned at least partially within the housing, the barcode camera having a first field-of-view (FOV) configured to be directed towards the product scanning area;
a vision camera positioned at least partially within the housing, the vision camera having a second FOV configured to at least partially overlap the first FOV;
a controller positioned within the housing and communicatively coupled to the barcode camera and the vision camera;
a decoder module positioned within the housing and communicatively coupled to the barcode camera and the controller; and
a video processing module positioned within the housing and communicatively coupled to the vision camera.

2. The indicia reader of claim 1, wherein the width of the housing is greater than 11.5 inches.

3. The indicia reader of claim 1, wherein the housing is configured to be attached to and mounted above a monitor.

4. The indicia reader of claim 1, comprising a second vision camera positioned at least partially within the housing and communicatively coupled to the controller and the video processing module, the second vision camera having a third FOV configured to at least partially overlap the first FOV.

5. The indicia reader of claim 4, wherein the second FOV at least partially overlaps the third FOV.

6. The indicia reader of claim 4, wherein the vision camera is located proximate a first end of the housing and the second vision camera is located proximate a second end of the housing, opposite the first end.

7. The indicia reader of claim 1, comprising a visual user interface communicatively coupled to the controller.

8. The indicia reader of claim 1, comprising a first aimer positioned at least partially within the housing and configured to produce a first light beam and a second aimer positioned at least partially within the housing and configured to produce a second light beam, the first aimer and the second aimer positioned such that the first light beam and the second light beam intersect at a predetermined distance below the indicia reader.

9. The indicia reader of claim 1, comprising an illumination source positioned at least partially within the housing and communicatively coupled to the controller, the illumination source configured to provide an illumination over the product scanning area.

10. The indicia reader of claim 1, comprising at least one of a three-dimensional (3D) sensor, an infra-red (IR) wakeup system, a radio-frequency identification (RFID) antenna, a radar, a radio frequency (RF) detector, and/or an electronic article surveillance (EAS) system positioned at least partially within the housing and communicatively coupled to the controller.

11. The indicia reader of claim 1, wherein there are no internal mirrors within the housing.

12. An indicia reader, comprising:
a housing configured to be attached to and mounted above a monitor and above a product scanning area;
a barcode camera positioned at least partially within the housing, the barcode camera having a first field-of-view (FOV) configured to be directed towards the product scanning area;
a vision camera positioned at least partially within the housing, the vision camera having a second FOV configured to at least partially overlap the first FOV;
a controller positioned within the housing and communicatively coupled to the barcode camera and the vision camera;
a decoder module positioned within the housing and communicatively coupled to the barcode camera and the controller; and
a video processing module positioned within the housing and communicatively coupled to the vision camera.

13. The indicia reader of claim 12, wherein a first distance between a front surface of the housing and a front surface of the monitor is less than or equal to 3 inches.

14. The indicia reader of claim 12, wherein: a second distance between a left side surface of the housing and a left edge of the monitor is less than or equal to 1 inch; and a third distance between a right side surface of the housing and right edge of the monitor is less than or equal to 1 inch.

15. The indicia reader of claim 14, wherein a width of the housing is adjustable.

16. The indicia reader of claim 12, wherein the first FOV is directed in front of a front surface of the monitor.

17. The indicia reader of claim 12, comprising a second vision camera positioned at least partially within the housing and communicatively coupled to the controller and the video processing module, the second vision camera having a third FOV configured to at least partially overlap the first FOV.

18. The indicia reader of claim 17, wherein the second FOV at least partially overlaps the third FOV.

19. The indicia reader of claim 17, wherein the vision camera is located proximate a first end of the housing and the second vision camera is located proximate a second end of the housing, opposite the first end.

20. The indicia reader of claim 12, comprising a visual user interface communicatively coupled to the controller.

21. The indicia reader of claim 12, comprising: a first aimer positioned at least partially within the housing and configured to produce a first light beam and a second aimer positioned at least partially within the housing and configured to produce a second light beam, the first aimer and the second aimer positioned such that the first light beam and the second light beam intersect at a predetermined distance below the indicia reader.

22. The indicia reader of claim 12, comprising an illumination source positioned at least partially within the housing and communicatively coupled to the controller, the illumination source configured to provide an illumination over the product scanning area.

* * * * *